US010362032B2

(12) United States Patent
Fitzgerald et al.

(10) Patent No.: US 10,362,032 B2
(45) Date of Patent: *Jul. 23, 2019

(54) PROVIDING DEVICES AS A SERVICE

(71) Applicant: Amazon Technologies, Inc., Seattle, WA (US)

(72) Inventors: Robert Eric Fitzgerald, Herndon, VA (US); Andrew J. Doane, Vienna, VA (US); Alexander Edward Schoof, Herndon, VA (US); Christopher Steven Helma, Herndon, VA (US); Rui Min, Fairfax, VA (US); Matthew A. Estes, Aldie, VA (US); Anand Mishra, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,203

(22) Filed: Jan. 23, 2018

(65) Prior Publication Data
US 2018/0152448 A1 May 31, 2018

Related U.S. Application Data

(63) Continuation of application No. 15/243,757, filed on Aug. 22, 2016, which is a continuation of application (Continued)

(51) Int. Cl.
*G06F 21/00* (2013.01)
*H04L 29/06* (2006.01)
(Continued)

(52) U.S. Cl.
CPC ........ *H04L 63/0876* (2013.01); *G06F 21/602* (2013.01); *H04L 41/0806* (2013.01);
(Continued)

(58) Field of Classification Search
CPC combination set(s) only.
See application file for complete search history.

(56) References Cited

U.S. PATENT DOCUMENTS 6,012,100 A 1/2000 Frailong et al.
7,424,616 B1 9/2008 Brandenburg et al.
(Continued)

FOREIGN PATENT DOCUMENTS

CN 102246465 11/2011
EP 1511218 3/2005
(Continued)

OTHER PUBLICATIONS

Berger et al., "vTPM: Virtualizing the Trusted Platform Module," Security 2006 15th USENIX Security Symposium, Aug. 2, 2006, XP061011058, 16 pages.
(Continued)

*Primary Examiner* — Ghazal B Shehni
(74) *Attorney, Agent, or Firm* — Davis Wright Tremaine LLP

(57) ABSTRACT

Devices, such as hardware security modules, are provided as a service. A customer of a computing resource provider is able to request the addition of a device to a network of the customer hosted by the computing resource provider. The computing resource provider reconfigures a set of computing resources so that the devices of the customer are able to communicate with the device as if the device was in the customer's own network.

20 Claims, 8 Drawing Sheets

Related U.S. Application Data

No. 13/830,114, filed on Mar. 14, 2013, now Pat. No. 9,426,154.

(51) Int. Cl.
  *H04L 12/24* (2006.01)
  *G06F 21/60* (2013.01)
  *H04L 29/08* (2006.01)

(52) U.S. Cl.
  CPC ...... *H04L 41/0809* (2013.01); *H04L 41/5054* (2013.01); *H04L 63/0272* (2013.01); *H04L 63/10* (2013.01); *H04L 63/102* (2013.01); *H04L 67/125* (2013.01); *H04L 63/101* (2013.01)

(56) References Cited

U.S. PATENT DOCUMENTS

| | | |
|---|---|---|
| 8,230,050 B1 | 7/2012 | Brandwine et al. |
| 2003/0028790 A1 | 2/2003 | Bleumer et al. |
| 2003/0061346 A1 | 3/2003 | Pekary et al. |
| 2004/0148429 A1 | 7/2004 | Audebert et al. |
| 2005/0036611 A1* | 2/2005 | Seaton, Jr. ............. G06F 21/31 380/44 |
| 2006/0078109 A1 | 4/2006 | Akashika et al. |
| 2006/0190570 A1 | 8/2006 | Booth, III et al. |
| 2007/0053510 A1 | 3/2007 | Rosati et al. |
| 2007/0300069 A1* | 12/2007 | Rozas ..................... G06F 21/57 713/176 |
| 2010/0165993 A1 | 7/2010 | Basilier |
| 2010/0188975 A1* | 7/2010 | Raleigh ............ G06Q 10/06375 370/230.1 |
| 2012/0173609 A1 | 7/2012 | Kulaga et al. |
| 2012/0179909 A1 | 7/2012 | Sagi et al. |
| 2012/0281540 A1 | 11/2012 | Khan et al. |
| 2012/0291024 A1 | 11/2012 | Barabash et al. |
| 2013/0019100 A1 | 1/2013 | Le Saint et al. |
| 2013/0179676 A1 | 7/2013 | Hamid |

FOREIGN PATENT DOCUMENTS

| | | |
|---|---|---|
| JP | 2004112037 | 4/2004 |
| JP | 2005065305 | 3/2005 |
| JP | 2008158992 | 7/2008 |
| JP | 2010079813 | 4/2010 |
| JP | 2012511878 | 5/2012 |
| JP | 2013500518 | 1/2013 |
| JP | 2013528872 | 7/2013 |
| JP | 2014512760 | 5/2014 |
| RU | 2301498 C2 | 6/2007 |
| WO | WO2009091492 | 7/2009 |
| WO | WO2013025229 | 2/2013 |
| WO | WO2014159750 | 10/2014 |

OTHER PUBLICATIONS

Chinese First Office Action for Patent Application No. 201480026848X dated Jan. 4, 2018, 9 pages.
International Search Report and Written Opinion dated Aug. 5, 2014, in International Patent Application No. PCT/US2014/024977, filed Mar. 12, 2014.
Microsoft, "Windows Server 2008 Complete PKI & Authentication Security," Microsoft Official Manual, Microsoft IT Professional Series, Nikkei BP Soft Press, First Edition, Japan, May 20, 2010 (reference showing well-known technique), pp. 193-206.
NIST, "Implementation Guidance for FIPS PUB 140-2 and the Cryptographic Module Validation Program," Initial Release Mar. 28, 2003, 205 pages.
Notice of Preliminary Rejection for Republic of Korea Application No. 10-2017-7014206, dated Nov. 17, 2018, 6 pages.
Russian Decision on Grant for Patent Application No. 2015143441 filed Mar. 12, 2014, 16 pages.
Wikipedia, "Hardware security module," from Wikipedia, the free encyclopedia, Nov. 14, 2011, retrieved on Oct. 19, 2016, from internet at https://en.wikipedia.org/w/index.php?title=Hardware_security_module&oldid=460625735 (reference showing well-known technique), 5 pages.
Wikipedia, "Hardware security module," Nov. 14, 2011, XP055202470, retrieved on Jul. 15, 2015, from https://en.wikipedia.org/w/index.php?title=Hardware_security_module&oldid=460625735, 4 pages.
Australian First Examination Report, dated May 4, 2018, for Patent Application No. 2017204316, 8 pages.
Australian Notice of Acceptance for Patent Application No. 2017204316, dated Oct. 30, 2018, 3 pages.
Buyya et al., "Market-Oriented Cloud Computing: Vision, Hype, and Reality for Delivery IT Services as Computing Utilities," The 10th IEEE Conference on High Performance Computing and Communications, published in 2008, retrieved on May 4, 2018, from https://ieeexplore.ieee.org/stamp/stamp.jsp?tp=&arnumber=4637675, 2 pages.
Canadian Office Action for Patent Application No. 2,906,530 dated Apr. 25, 2018, 3 pages.
Chinese Second Office Action, dated Sep. 14, 2018, for Patent Application No. 201480026848.X, 5 pages.
Eludiora et al., "A User Identity Management Protocol for Cloud Computing Paradigm," Int. J. Communications, Network and System Sciences, Mar. 2011, 4:152-163, retrieved from the internet on May 4, 2018, from http://citeseerx.ist.psu.edu/viewdoc/download?doi=10.1.1.457.4727&rep=rep1&type=pdfon.
European Communication of Extended Search Report, dated Jul. 3, 2018, for Patent Application 17207453.6, 7 pages.
Ideler, "Cryptography as a Service in a Cloud Computing Environment," Eindhoven University of Technology Department of Mathematics and Computing Science, Master's Thesis, retrieved from the internet on May 4, 2018, at http://alexandria.tue.nl/extra1/afstversl/wsk-i/ideler2012.pdf, 162 pages.
Japanese Notice of Allowance dated Sep. 4, 2018, for Patent Application No. 2017-112785, 6 pages.
Korean Decision of Patent Grant for Patent Application No. 10-2017-7014206 dated Apr. 23, 2018, 4 pages.
Tatezono, "MPI Environment with Load Balancing using Virtual Machine," The Institute of Electronics, Information and Communication Engineers, Japan, Jul. 28, 2005, Technical Report of IEICE, 105(225):7-12.

\* cited by examiner

PROVIDING DEVICES AS A SERVICE

CROSS REFERENCE TO RELATED APPLICATIONS

This application is a continuation of U.S. patent application Ser. No. 15/243,757, filed on Aug. 22, 2016, entitled "PROVIDING DEVICES AS A SERVICE," which is a continuation of U.S. patent application Ser. No. 13/830,114, filed on Mar. 14, 2013, now U.S. Pat. No. 9,426,154, issued on Aug. 23, 2016, entitled "PROVIDING DEVICES AS A SERVICE," the disclosures of which are incorporated herein by reference in their entirety.

BACKGROUND

Distributed computer systems provide increasingly effective ways of providing numerous types of services. As the complexity and ubiquity of distributed computer systems increases, however, maintaining data security becomes more challenging. There is a constant struggle to address security vulnerabilities at least as fast as they discovered. This struggle is exacerbated by the speed at which computer systems and their use evolve and the rate at which the stakes increase. At the same time, in many contexts, the security of data is of great importance. Many people, for example, trust companies with data that is intended to be kept private except in relatively few circumstances. Security breaches, consequently, can have harmful effects on an organization's operations, from a loss of trust and goodwill to an inability to do business due to a system malfunction caused by a security breach.

Over the years, many strategies have been developed to address the ever increasing threats to data security. Data encryption, for example, can provide an effective way of preventing unauthorized access to data. As a result, complex devices have been developed to securely store cryptographic information, such as cryptographic keys. While such devices often perform well for various purposes, integrating the devices into various infrastructure strategies can present many challenges. Further, such devices often require a significant investment, which can be an obstacle to many organizations.

BRIEF DESCRIPTION OF THE DRAWINGS

Various embodiments in accordance with the present disclosure will be described with reference to the drawings, in which.

DETAILED DESCRIPTION

Figure 1:
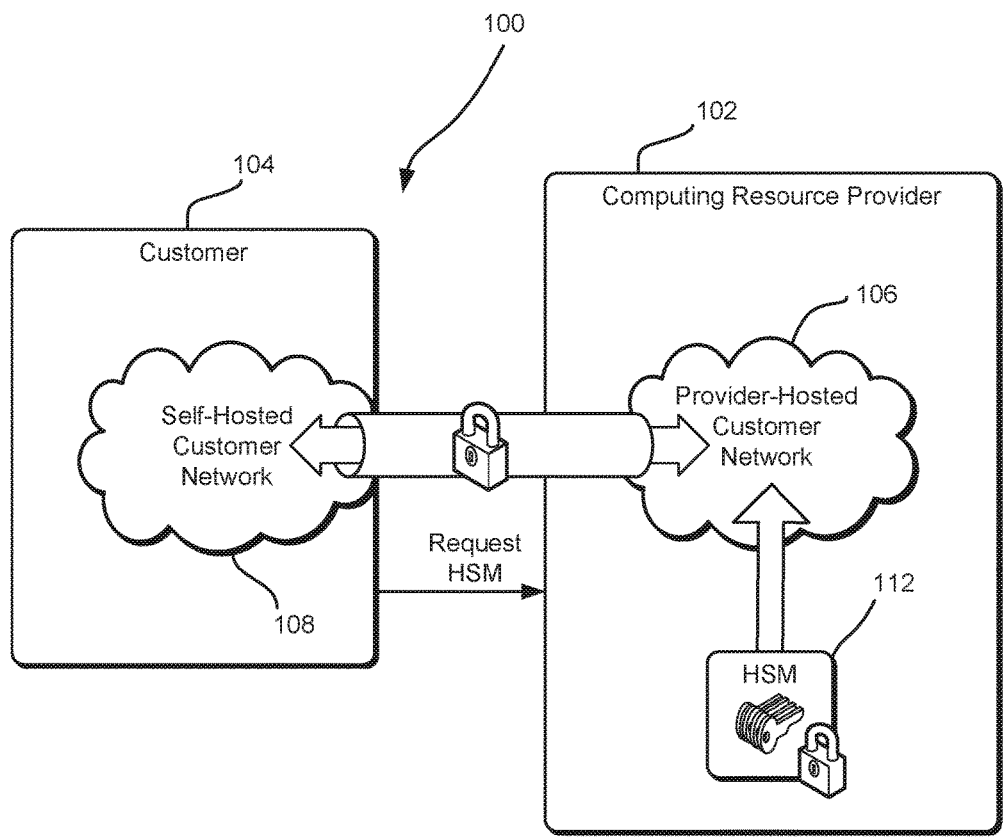
FIG. 1 shows an illustrative example of an environment in which various embodiments of the present disclosure may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to providing use of devices as a service. In some examples, the devices are hardware security modules (HSMs) provided as a service to customers by a computing resource provider that remotely hosts various computing resources that are remotely managed and operated by the customers, examples of which are described below. A customer of the computing resource provider may utilize services of the computing resource to maintain a private network, such as a virtual local area network (VLAN) hosted by the computing resource provider. The VLAN may, for instance, be supported by infrastructure operated by the computing resource provider.

A secure connection, such as a virtual private network connection over an Internet protocol security (IPsec) tunnel, may connect the remotely hosted network to a network that is hosted on the premises of the customer. Traffic to and from the remotely hosted network may be managed by the computing resource provider so that, from the perspective of devices in the customer's on-premises network, communications with devices in the remotely hosted network occur as if the devices of the remotely hosted network are located in the customer's on-premise network. For example, communications to devices in the remotely-hosted network may be addressed by the customer devices to addresses in a space of network addresses managed by the customer (e.g., to network addresses in a subnet of a network managed by the customer). The computing resource provider can use various techniques, such as network address translation (NAT), to route network communications over its own network to their proper destinations.

In various embodiments of the present disclosure, customers are able to interact with the computing resource provider (e.g., through appropriate systems operated by the computing resource provider) for the purpose of managing remotely hosted networks. A customer may, for instance, submit an electronic request to the computing resource provider to add one or more devices to the remotely hosted network, to remove one or more devices from the remotely hosted network, to reconfigure the network topology of the remotely hosted network, and for other purposes. Requests may occur, for example, over appropriately configured application programming interface (API) calls which may utilize various Web services techniques. The computing resource provider may process the requests and, if appropriate, reconfigure the customer's network as requested.

In some embodiments, customers are able to interact with the computing resource provider for the purpose of adding one or more HSMs to a remotely hosted network. To process a request for an HSM to be added to the customer's network, the computing resource provider may select a suitable HSM from a set of available HSMs and allocate the HSM to the customer such as by marking assignment of the HSM to the customer in a data store to prevent the HSM from being used for other customers while assigned to the customer. The computing resource provider may set up a network (service network) for the HSM, such as a VLAN and add a network interface to the service network in the customer's remotely hosted network. The network interface to the service network may have an address in the customer's IP space so that the customer can communicate to the HSM as if the HSM was in the customer's own network. The customer may configure one or more HSM clients in the customer's on-premise network, off-premise network or both. This process may be repeated to provide the customer use of multiple HSMs, such as to increase availability or decrease latency.

Various techniques may be employed to provide customers enhanced data security. For instance, in some examples, an HSM has at least two administrative interfaces. A first administrative interface may be used by the computing resource provider to perform various administrative functions, such as permanently (i.e., irrevocably) erasing any cryptographic information stored on the HSM. Another administrative function available through the first administrative interface, in some embodiments, is to create an account having access to the second administrative interface. An account able to access the first administrative interface may share some privileges with one or more accounts able to access the second administrative interface, such as the ability to permanently erase cryptographic information. An account that is able to access the first administrative interface may, however, have some differing access rights. For instance, in some embodiments, the first administrative interface is unable to access cryptographic information stored by the HSM. The second administrative interface, however, may have additional administrative abilities, such as the ability to create security officer accounts. A security officer account may have the ability to create and/or delete partitions of the HSM, create clients, and cause the HSM to perform cryptographic operations.

To assure a customer that the computing resource provider does not have access to the customer's cryptographic information stored in an HSM, the computing resource provider may provide the customer access to the HSM in a manner giving the customer control over who can access the HSMs cryptographic information. For example, the computing resource provider may use a first administrative interface to create an account able to access the second administrative interface. Credentials for the created account may be provided to the customer who can use the credentials to change the credentials (e.g., change the password), thereby removing access to the second administrative interface from the computing resource provider. The customer can then use the second administrative interface to further configure the HSM with confidence that the computing resource provider is unable to access cryptographic information stored by the HSM. Additional details and features are discussed in more detail below.

FIG. 1 shows an illustrative example of an environment 100 in which various embodiments of the present disclosure may be practiced. In this example, the environment 100 includes a computing resource provider 102 and a customer 104 of the computing resource provider. The computing resource provider 104 may be an organization that hosts various computing resources on behalf of one or more customers. For example, a computing resource provider may operate one or more facilities that are used to host various computing hardware resources, such as hardware servers, data storage devices, network devices, other devices discussed herein and other equipment, such as server racks, networking cables and the like. The computing resource hardware may utilize its computing hardware resources to operate one or more services. Such services may include services that enable customers of the computing resource provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

As noted above, a computing resource provider may use its computing hardware resources to provide customers with use of one or more hardware security modules (HSMs) as a service. An HSM is a hardware device (e.g., hardware appliance) that is dedicated to protect information (e.g., cryptographic keys) from unauthorized disclosure and to perform operations using the protected information. An HSM may be implemented in a variety of ways, such as a plug-in card (configured to plug into circuitry of a computing device) or an external TCP/IP security device that may be connected to a computing device or may be accessible over a network. An HSM may store cryptographic keys that are used by the HSM to perform one or more types of cryptographic operation, such as encryption, decryption, or electronic signature generation. An HSM may utilize one or more secure cryptoprocessor chips to prevent tampering and bus probing. In addition, an HSM may be configured to comply with one or more security standards. In some examples, HSMs are configured to comply with one or more of the National Institute of Standards and Technology's (NIST's) Federal Information Processing Standards (FIPSs), such a security level (e.g., level 1, level 2, level 3, or level 4) of FIPS Publication 140-2, which is incorporated herein by reference.

It should be noted that, while the present disclosure uses HSMs when providing illustrative examples, the techniques of the present disclosure are also applicable to security modules (also referred to as "cryptographic modules") in general. For example, while many security modules (e.g., HSMs) utilize specialized cryptoprocesors and/or other hardware, one or more of the above features may be implemented using software. For instance, a security module may be produced to be compliant with one or more levels of FIPS Publication 140-2 using commodity hardware and appropriately configured software instead specialty hardware often found in commercial HSMs.

In the environment 100 illustrated in FIG. 1, the computing resource provider 102 hosts a provider-hosted customer network 106 on behalf of the customer 104. The provider-hosted customer network 106 may be a network of computing devices managed by the customer 104. The provider-hosted customer network 106 may be a virtual network implemented by a physical network of devices of the computing resource provider 104, which may also implement virtual devices and/or virtual networks for other customers of the computing resource provider 104 (not shown). Suitable provider-hosted customer networks are often referred to as virtual private clouds (VPCs). Generally, the provider-hosted customer network may be definable, configurable and/or otherwise manageable by the customer via appropriately configured application programming interface (API) calls to the computing resource provider 102. The provider-hosted customer network may be, for example, configured by the customer 104 to have a virtual network topology that closely resembles a traditional network that the customer might operate in its own datacenter. The computing resource provider 102 may also implement provider-hosted customer networks so as to be isolated from one another. For example, a provider-hosted customer network of a customer may be implemented so that the devices in the network are not communicatively or otherwise accessible to other customers of the computing resource provider without the customer having configured the network to allow such access.

As noted, the customer 104 may configure the provider-hosted customer network in various ways. The customer may, for example, assign IP addresses to devices from the customer's own IP address range (instead of using IP addresses assigned by the computing resource provider 102), create one or more subnets, configure routing tables, configure network gateways and/or otherwise configure the network. In instances where the customer assigns IP addresses from its own IP address space, the computing resource provider may utilize network address translation (NAT) techniques to manage network traffic among the various devices hosted by the computing resource provider. For instance, the computing resource provider may wrap packets addressed to IP addresses of the customer 104 in packets addressed to IP addresses managed by the computing resource provider 102 for transmission among the various devices managed by the computing resource provider. Upon delivery to a customer device having an IP address addressed from the customer IP space, the computing resource provider may unwrap the packets.

With respect to subnet configuration and management, numerous arrangements may be utilized by customers. For example, the customer 104 may create a public-facing subnet for webservers that have access to the Internet. The customer may create a private-facing subnet for backend systems with no Internet access. The customer may leverage multiple layers of security, including firewalls and network access control lists, to help control access to devices in each subnet.

Additionally, as illustrated in FIG. 1, the customer may have its own self-hosted customer network 108. The self-hosted customer network may be a network (physical, virtual, or combination of physical and virtual) hosted using the customer's 104 own hardware. As illustrated in FIG. 1, the self-hosted customer network 108 and provider-hosted customer network 106 communicate with one another over a secure channel 110, such as an Internet Protocol Security (IPsec) tunnel or a direct connection, although other mechanisms for secure communication may be used. In one example, the secure channel 110 is a virtual private network (VPN) connection using an appropriate security protocol, such as IPsec. In this manner, the secure channel 110 effectively extends the customer's 104 self-hosted customer network 108 with the provider-hosted customer network 106 as if the resources of both networks were co-located using hardware resources of a single facility.

It should be noted, however, that the particular configuration of the environment 100 illustrated in FIG. 1 is for the purpose of illustration and that other configurations are also considered as being within the scope of the present disclosure. For example, environments that utilize the techniques described herein do not necessarily need to include a self-hosted customer network connected to a provider-hosted customer network over a secure channel. A customer may, for instance, maintain a provider-hosted customer network separate from any self-hosted customer networks. In addition, a fewer or greater number of networks than illustrated in FIG. 1 may be included in environments that utilize various embodiments of the present disclosure. Further, while a customer-computing resource provider relationship is used extensively throughout the present disclosure for the purpose of illustration, the scope of the present disclosure is not limited to environments that utilize such relationships. Various techniques described herein, for example, may be used to enable one entity to provide use of one or more devices (e.g., HSMs) to one or more other entities. Further, an entity providing the service and an entity consuming the service may be sub-entities of the same entity. For example, a computing resource provider may utilize the techniques described herein to provide use of an HSM to a sub-entity of the computing resource provider (e.g., a business unit that provides another type of service to customers).

As noted above, embodiments of the present disclosure provide customers the ability to remotely request and configure HSMs to become part of provider-hosted customer networks. As illustrated, the customer 104 may submit a request (labeled as "Request HSM" in the figure) to the computing resource provider 102. The customer may, for instance, transmit an appropriately configured API call to the computing resource provider which may include one or more systems configured to process API calls. The computing resource provider may initiate a workflow that causes computing resources of the computing resource provider to, in response to the request, cause one or more HSMs 112 to logically become part of the provider-hosted customer network. In other words, the computing resource provider may configure appropriate computing resources so that the customer is able to communicate with the HSM 112 as if the HSM was in the customer's own network. For instance, requests to the HSM 112 may be addressed to an IP address for the HSM that is part of the customer's own IP space (e.g., a public IP address that the customer owns or controls or a private IP address of the customer).

Figure 2:
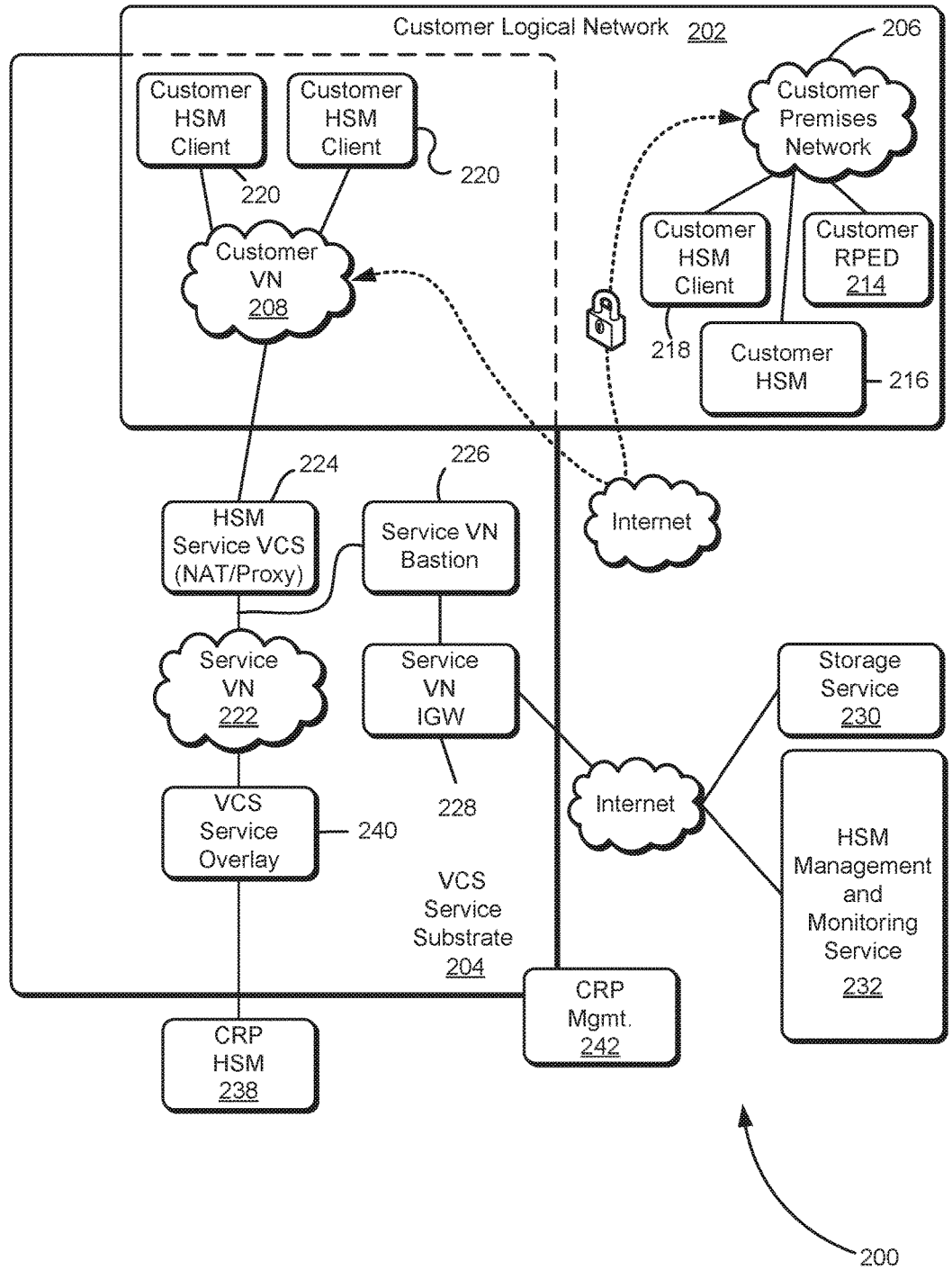
FIG. 2 shows an illustrative example of an environment in which hardware security modules may be provided as a service in accordance with at least one embodiment.

FIG. 2 shows an illustrative example of an environment 200 which may be used to provide use of one or more HSMs as a service. As illustrated in FIG. 2, the environment 200 includes a customer logical network 202 and a virtual computer system (VCS) service substrate 204, which may be a collection of devices forming a network that is used to implement virtual computer systems that are provided as a service. For example, the VCS service substrate 204 may include one or more hardware server devices that are each configurable/configured to implement one or more virtual computer systems, such as virtual servers. The VCS service substrate 204 may also include other devices that enable the VCS service, such as switches, routers, and/or other devices that enable communications to/from/within devices of the VCS substrate 204.

The customer logical network 202 may be a network comprising one or more self-hosted customer networks and one or more provider-hosted customer networks, such as described above in connection with FIG. 1. As illustrated, the customer logical network includes resources hosted by a computing resource provider (e.g., resources shown inside both the VCS service substrate 204 and the customer logical network 202) and resources hosted by a customer of the computing resource provider (e.g., resources shown inside the customer logical network 202 but outside of the VCS service substrate 204. For instance, as illustrated in FIG. 2 the customer logical network 202 includes a customer premises network 206 (e.g., a self-hosted customer network) and a customer virtual network (VN) 208 (e.g., a provider-hosted customer network). The customer premises network 206 and customer VN 208 may be virtual local area networks (VLANs), which may be mutually isolated logical divisions of respective larger networks.

The customer premises network 206 and customer VN 208 may be configured to operate as a single network. For example, as illustrated, the customer premises network 206 and customer VN 208 may be configured so that data is able to flow securely between the two networks. For example, a direct connection between the customer premises network 206 and customer VN 208 may be utilized. In another example, the customer premises network 206 and customer VN 208 are connected by a virtual private network (VPN) connection (e.g., over IPsec). The customer logical network 202 may also include various devices that enable its operation, such as an on-premise virtual gateway (VGW) and a VGW that is implemented by the VCS service substrate 204 (off-premise VGW). The on-premise VGW and off-premise VGW may be gateway devices configured to enable communication between devices on premise of the customer and devices on premise devices of the computing resource provider. The VGW and VGW may each be configured, for example, to translate between one communications protocol to another communications protocol and/or perform any other operations so that communications are possible between the devices of the customer and computing resource provider. In some examples, the on-premise VGW and off-premise VGW communicate over a secure channel, such as an IPsec tunnel or a direct connection. Also illustrated, the customer network may include one or more customer remote personal identification number (PIN) entry devices (RPEDs) 214. A customer RPED 214, in an embodiment, is a device specifically configured for the purpose of authentication with one or more HSMs. A customer RPED 214 may be manufacturer specific so that, for instance, if a customer requests a particular type of HSM, the customer may purchase a customer RPED 214 for the particular type of HSM requested and add the customer RPED 214 to the customer logical network 206. Customer RPEDs 214 may be tamper proof and may include other security features to prevent key logging and other security breaches. An operator of the customer (e.g, authorized user) may utilize the RPED 214 to input a password to gain access to information stored by a corresponding HSM (or set of HSMs).

As illustrated in FIG. 2, the customer logical network 202 may include a customer on-premise HSM 216. The customer on-premise HSM may be an HSM hosted by the customer for the purpose of securely storing information (e.g., cryptographic keys) and performing cryptographic operations with the securely stored information. Accordingly, the customer logical network 202 may include, as part of the customer premises network 206, one or more on-premise HSM clients 218 that are devices (or components of devices, such as programming modules loaded on devices) configured to submit requests to the on-premise HSM (and, perhaps, as discussed below, to one or more off-premise HSMs). In some examples, the on-premise HSM clients 218 and customer logical network 202 are collectively configured such that each customer HSM client is able to submit requests to an off-premise HSM appliance (as described below). Such requests (and responses to the requests) may be routed through an on-premise VGW 210 and off-premise VGW, over a secure channel (e.g., IPsec tunnel), as discussed above.

The customer logical network 202 may also include, as part of the customer VN 208, one or more devices that are not hosted by the customer, but may be hosted by a computing resource provider. For example, FIG. 2 shows the customer logical network 202 including off-premise customer HSM clients 220 that are hosted by the computing resource provider. In this particular example, the off-premise customer HSM clients 220 are implemented by the VCS service substrate 204 (e.g., as virtual computer systems implemented by physical servers of the VCS service substrate). The off-premise customer HSM clients 220 may be devices (e.g., virtual computer systems) configured to communicate with an HSM (e.g., the on-premise customer HSM 216 or a customer off-premise HSM, described below), such as the on-premise HSM client 218, described above. As illustrated, the customer VGW 212 is also implemented by the VCS service substrate 204 in this example.

In an embodiment, the VCS substrate implements a collection of devices outside of the customer logical network 202 that enable the computing resource provider to provide use of an HSM as a service, in particular, by enabling communication to an HSM appliance that, from the customer's perspective, is addressed to an IP address of a customer's subnet. For instance, in an embodiment, the VCS service substrate includes a service VN 222, which may be a VLAN that includes an HSM Service VCS network address translation proxy (NAT Instance 224) and a service VN bastion 226. The NAT instance 224 may be a device (e.g., virtual computer system implemented by the VCS service substrate) that is configured to perform network address translation (NAT) between an HSM appliance and a subnet in the customer VN 208, as described in more detail below. Briefly, the NAT performed by the NAT instance enables a customer to address communications to an IP address of the customer's IP space, while the computing resource provider can route such communications using IP addresses of its own IP space.

The service VN bastion 226 may be a device (e.g., virtual computer system implemented by the VCS service substrate) that is configured in a public subnet with an Internet gateway. The service VN bastion 226 may be configured to receive messages in connection with monitoring the HSM appliance. The VN bastion 226 may, for instance, receive messages from metrics systems such a monitoring system, logging archival services, and the use of various other services of the computing resource provider (e.g., a data storage service for storing monitoring data and/or a queue service). The VN bastion 226 may also be configured with appropriate security controls that will only allow certain connections (e.g. secure shell (SSH) connections) from computing resource provider firewalls. Firewalls between the service VN bastion and the NAT instance 224 may be configured to prevent undesirable connections, such as SSH connections between the service VN bastion 226 and NAT instance 224.

As illustrated, the service VN bastion 226 communicates over the Internet through a service VN integrated gateway (IGW) 228 to various services, such as a data storage service 230 and an HSM management and monitoring service 232. The HSM management and monitoring service 232 may be a system configured to perform various management and monitoring of HSMs provided as a service. The HSM management and monitoring service 232 may include various components such as a network time protocol (NTP)

server, a monitoring sub-service, and an HSM service diagnostics and management sub-service. The data storage service 230 may be a service that stores data sent to the service through the service VN IGW 228, for consumption by other services and/or archival reasons, as well as other data provided in other ways by other systems. The monitoring sub-service may be a service that consumes data from the service VN bastion 226 and, if applicable, detects malfunctions and/or other events. The HSM service diagnostic and management sub-service may be configured to consume data from the service VN bastion 226 and/or monitoring sub-service and perform analysis on the data to provide diagnostic information and to perform management functions (e.g., cause reprovisioning of failed devices supporting the HSM service and/or other management functions).

As noted above, the customer logical network 202 includes devices that communicate with an HSM appliance, which, in some examples, is an abstraction of a physical HSM. Accordingly, as illustrated in FIG. 2, in various embodiments, the environment 200 includes a computing resource provider (CRP) HSM 238. The CRP HSM 238, as with the customer HSM 216, may be a physical HSM device. An example physical HSM device is the Luna SA HSM by SafeNet, Inc., although other models are considered as being within the scope of the present disclosure. The CRP HSM 238, in an embodiment, is allocated exclusively to a single customer. In this manner, unlike other computing resources provided as a service, other customers do not utilize the device (unless authorized by the customer to whom the CRP HSM 238 is allocated). As illustrated, the CRP HSM 238 is communicatively connected to the service VN 222 so that network traffic can be routed between the customer VN 208 and the CRP HSM 238 over the service VN. In the example shown in FIG. 2, the CRP HSM 238 is configured to communicate with the service VN 222 through a VCS service overlay device 240. Because the CRP HSM 238, as a physical hardware device connected to the VCS service substrate 204, is outside of the service VN 222, the VCS service overlay device 240 may employ network address translation, as appropriate to enable traffic from the CRP HSM 238 to travel over the service VN 222 to the customer VN 208, and vice versa.

In an example embodiment, the CRP HSM 238 is connected to an HSM top of rack (ToR) switch that is configured to route traffic from the CRP HSM 238 to a direct connection (DX) to an overlay network that includes the service VN 222. For example, the CRP HSM 238 may connect to the Service VN 222 through a DX router configured to route network traffic between the service VN 222 and the CRP HSM 238. The DX router may route traffic to/from a VCS service overlay device 240. Likewise, the DX router may route packets from the CRP HSM 238 (received via the HSM service TOR switch) so that the packets are appropriately provided to their appropriate destination (e.g., an appropriate customer HSM client that transmitted a request to the CRP HSM 238).

Summarizing, a computing resource provider hosts a physical CRP HSM 238. Various techniques may be utilized to allow a customer of the computing resource provider to use the CRP HSM 238 as if the CRP HSM 238 was in the customer's own data center. In an example embodiment, the CRP HSM 238 is in a server rack of the computing resource provider and connected to a ToR switch (e.g., a ToR switch in the same rack) by a suitable physical connection, such as an Ethernet connection. The ToR switch has a physical connection to a DX router, which is configured to route network traffic to/from the CRP HSM 238 and a VCS service overlay device. The VCS service overlay device 240, in some examples, is configured to route traffic to/from through a private VLAN (the service VN 222) to the customer VGW 212. A NAT instance 224 uses network address translation to route packets across the different interfaces of the service VN 222 and the customer VN 208.

The customer of the computing resource provider can submit requests to the CRP HSM 238 by transmitting the requests to an IP address that, from the perspective of the customer is an HSM appliance but, in terms of the example network topology illustrated in FIG. 2, is an interface of the NAT instance 224, which is configured to route the requests over the service VN 222 to the CRP HSM, which has an IP address different from the NAT instance 224. Similarly, when the CRP HSM 238 generates a response to a request (e.g., by performing one or more cryptographic operations and/or by providing, in the response, results of performance of the one or more cryptographic operations), the response is routed to the appropriate HSM client (e.g., off-premise customer HSM client 220 or on-premise customer HSM client 218) with network address translation being performed to enable the routing to be performed correctly and so that, from the perspective of the customer devices, to enable the response to have an originating address as if the response originated from the customer's own network.

Also illustrated in FIG. 2 is a CRP management system 242, which may be a network of computing devices configured to manage the resources of the computing resource provider, such as the computing resources of the VCS service substrate and HSMs. The CRP management system 242, in an embodiment, is configured to perform various operations in connection with management of the resources. For example, the CRP management system provides an application programming interface (API) that enables customers to submit requests over a network (e.g., the Internet). In some examples, the CRP management system 242 include one or more web servers (such as described in more detail below) configured to receive API calls in the form of Web service requests. The web servers may be configured to, upon receipt of a Web service request, transmit a request (e.g., forward the request or transmit a new request generated based at least in part on the Web service request) to a subsystem of the CRP management system 242 configured to process the request by executing one or more workflows for fulfilling the request. Example requests include requests to provision or deprovision virtual computer systems, to create a VN, to reconfigure a VN, requests to add one or more HSMs to a VN, requests to provision storage devices (for a data storage service (not shown)), and the like. The CRP management system, in an embodiment, is also configured to process the requests and perform additional operations in connection with request processing (e.g., authentication). Processing a request may include processing a workflow managed by the CRP management system 242. A workflow may comprise a set of operations to be performed to process a corresponding request. For example, operations for provisioning a virtual computer system may include operations such as selecting a hardware resource (e.g., hardware server) to implement the virtual computer system, loading a machine image onto the selected hardware resource, reconfiguring network routing, and/or other operations.

Figure 3:
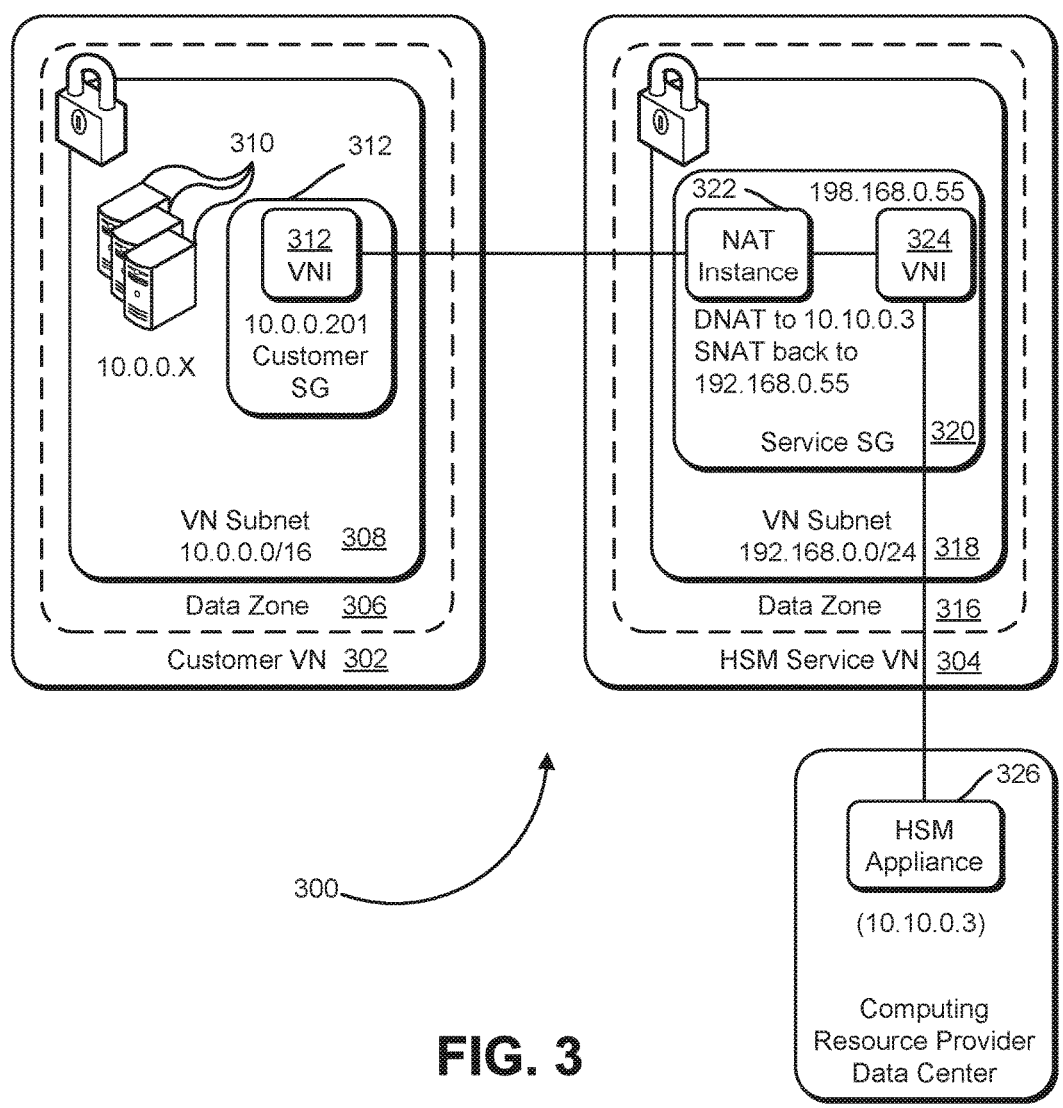
FIG. 3 shows an illustrative example of a diagram illustrating a manner of providing use of a hardware security module as a service in accordance with at least one embodiment.

As discussed above, various techniques described herein allow a customer to configure a network to include a remotely-hosted HSM. FIG. 3 shows an illustrative example of one manner by which this may be done. FIG. 3, in particular, shows an illustrative example of an environment 300 for enabling a customer of a computing resource provider to utilize a computing resource provider's offering of use of an HSM as a service. As illustrated in FIG. 3, the environment includes a customer VN 302 and an HSM service VN 304, which may be the customer VN 208 and Service VN 222, respectively, described above.

The computing resources of the customer VN 302 may include computing resources hosted in one or more data zones. A data zone may comprise a set of computing resources that is separated from another set of computing resources of another data zone. Data zones may be engineered for the purpose of fault tolerance so that, events causing inoperability of one or more computing resources one data zone have little or no effect on the operability of logically independent computing resources in one or more other data zones. As an illustrative example, a set of computing resources hosted in a first data center may comprise a first data zone and another set of computing resources hosted in a second data center may comprise a second data zone. A power failure in the first data center that causes an inoperability of one or more computing resources of the first data zone would not cause a loss of power to the computing resources of the second data zone. Thus, the power failure would not affect the operability computing resources of the second data zone unless, for example, a computing resource of the second data zone was a client of an inoperable computing resource (e.g., virtual server) of the first data zone.

Data zones may be implemented in various ways. For example, a data zone may be implemented by a data center or collection of data centers clustered in a geographic region and having direct communication connections among one another. As another example, data zones may be implemented by different rooms of a data center that are each supplied by a different power generator. Generally, data zones may be implemented in any manner that increases the fault tolerance of one data zone with respect to events (power loss, fire, earthquake, operator error and the like) occurring in one or more other data zones. A computing resource provider (or, generally, any entity) may operate multiple data zones to provide customers greater fault tolerance, failover options and other benefits, such as reduced latency. The computing resource provider may, for instance, operate multiple data zones throughout the world to provide customers with numerous options for performance and fault tolerance.

Accordingly, as illustrated in FIG. 3, the customer VN 302 comprises resources in a data zone 306. While a single data zone 306 is illustrated, as discussed in more detail below, the customer VN 302 may comprise computing resources from multiple data zones. A subnet (VN subnet 308) of the customer 302, in this example, is implemented using resources of the data zone 306. Using classless inter-domain routing (CIDR) notation, the VN subnet uses an illustrative example of IP addresses, in this instance 10.0.0.0/16. It should be noted that, for the purpose of illustration, IP addresses are illustratively provides as Internet protocol version four (IPv4) IP addresses. However, different addressing methods, including, but not limited to Internet protocol version six (IPv6) addresses, may be used in various embodiments.

The VN subnet 308, in this example includes various devices 310 (which may be, for example, virtual computer systems or virtual storage devices) that have IP addresses of the customer in the 10.0.0.0/16 range. The VN subnet 308 of the customer VN 302 also includes a customer service gateway (customer SG 212), which may be a gateway device configured with a virtual network interface (VNI) 314. The VNI 314, as illustrated, has an IP address of 10.0.0.201.

As with the customer VN 302, the HSM service VN 304 may be implemented using computing resources of a data zone 316, which may be the same data zone as the data zone 306 of the customer VN 302 or which may be different from the data zone 306. Computing resources of the data zone 316 are used to implement a VN subnet 318 which, in this example, has an IP address space of 192.168.0.0/24. The VN subnet 218 includes a service SG 320 that comprises a NAT instance 322 (which may be a NAT instance, such as described above) and a VNI 324. The VNI 324, as an illustrative example, has an IP address in the IP space of the VN subnet 318, the address being 192.168.0.55.

Also, as illustrated in FIG. 3, the environment 300 includes a physical HSM appliance 326 which, in this example, has an IP address of 10.10.0.3. The HSM appliance may be directly connected to the VNI 324 and the NAT instance may be configured to perform appropriate network address translation.

In an embodiment, the NAT instance 322 performs network address translation. For example, network traffic from the customer facing VNI 314 may be forwarded to 10.10.0.3, the IP address of the HSM appliance 326. The NAT instance 322 may perform network address translation to change network traffic's destination IP address to 10.10.0.3. To ensure that the return traffic from the HSM appliance 326 reaches the same NAT instance (e.g., if multiple NAT instances are used) the NAT instance 322 may also change the source IP address to 192.168.0.55, its own inward-facing IP address. Because the network traffic returns from the HSM to the same device, the NAT instance is able to ensure that the traffic reaches the correct destination. For example, the NAT instance 322 may be programmed to forward traffic from the HSM appliance 326 to the NAT instance 322 to an appropriate customer device (e.g., the device that originally submitted the request to the HSM), performing NAT as appropriate.

In this manner, from the perspective of the HSM appliance 326, client traffic originates from 192,168.0.55, the IP address of the NAT instance. Further, the HSM appliance 326 may lack any information identifying characteristics (e.g., IP addresses) of the customer VN 302. From the point of view of a customer device 310, the IP address of the VNI 314 (10.0.0.201) appears to be the IP address of the HSM appliance 326. For instance, a customer device 310 may transmit a request to perform one or more cryptographic operations to 10.0.0.201, receive a response from 10.0.0.201, while a device with a different IP address (i.e., the HSM appliance 326) actually performs the requested cryptographic operations.

Figure 4:
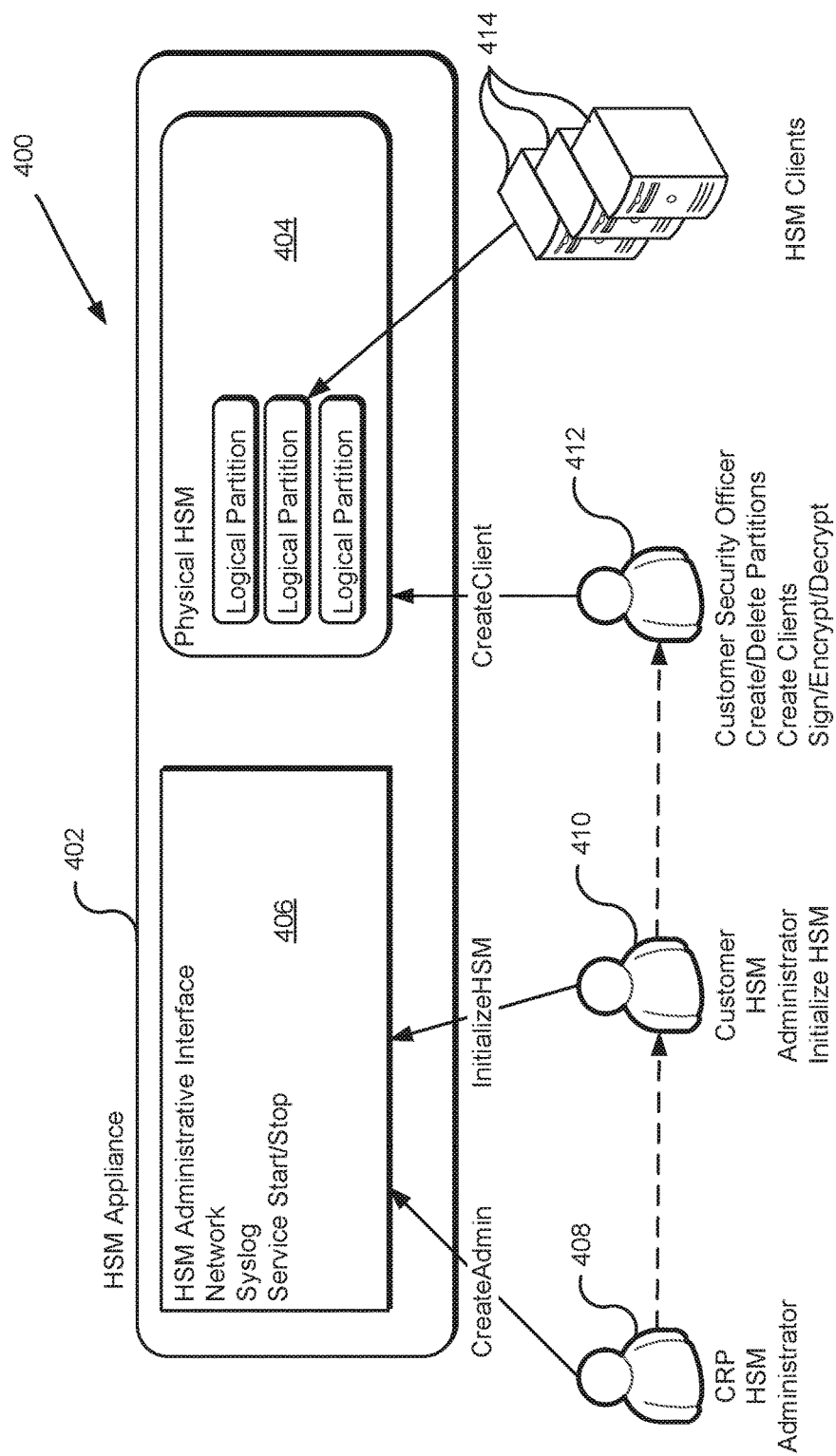
FIG. 4 shows an illustrative example of a diagram illustrating a manner in which a hardware security module can be provided as a service in accordance with at least one embodiment.

Various embodiments of the present disclosure allow a computing resource provider to provide use of an HSM as a service while addressing various security concerns. For example, some customers of a computing resource provider may insist that a computing resource provider lack access to any cryptographic information stored by an HSM on behalf of the customer (e.g., keys used by the customer). FIG. 4 shows a diagram 400 illustrating an example manner in which this may be accomplished. It should be noted, however, that the processes illustrated in FIG. 4 and discussed herein are illustrative in nature and that other methods of providing an HSM as a service without a computing resource provider retaining access to information stored by the HSM may be used. For example, different HSM manufacturers may employ different processes and/or interfaces that may be used in different ways to ensure a computing resource provider cannot access sensitive customer information stored on an HSM.

In particular, the diagram 400 in FIG. 4 shows an HSM appliance 402, which may be an HSM appliance requested by a customer of a computing resource provider and that is hosted by the computing resource provider, such as described above. The HSM appliance 402 may be a logical container that contains the HSM administrative interface 406 and a portion of the HSM appliance that physically and securely contains the cryptographic information (labeled as the "physical HSM 404" in FIG. 4. In an embodiment, the HSM appliance 402 can be considered an appliance that comprises components defined by accessibility. For example, in an embodiment, the HSM appliance 402 includes an administrative interface accessible by those having certain administrative roles. In this example, the roles include a CRP administrator 408 and a customer administrator 410. Access to the administrative interface 406 may require appropriate authentication (e.g., through presentation of credentials) and the amount of access may depend on specific role. Further, access to the administrative interface 406 may require a secure connection, for example, through SSH. In an embodiment, an authenticated CRP HSM administrator 408 may have the ability to create, for the HSM appliance 402, one or more customer HSM administrators 410. Other actions that may be performed by an CRP HSM administrator include, in various embodiments, creation and management of policies, network setup, logging and/or other administrative activities.

A customer HSM administrator 410, may have the ability to interact with the HSM administrative interface to perform various administrative activities, such as initialization of the HSM appliance 402, such as by submitting an InitializeHSM command to the HSM appliance 402. Initialization of the HSM may result in the creation of one or more security officer (SO) roles. An authenticated security officer (labeled as a customer security officer 412) may have the ability to manage the configuration of the HSM, such as by creating partitions, creating clients (a set of devices with access rights sufficient for submission of requests to the HSM in connection with a corresponding partition), assign clients to partitions (i.e., define which partition(s) each client can access) and the like. Creation of a client may include updating an entry in a data store of the HSM appliance that indicates the client is authorized to utilize the HSM. The SO that created a client (or another operator) may configure a client device with appropriate software to enable utilization of the HSM. In other words, enabling a device to utilize the HSM appliance 402 may include appropriate configuration of both the HSM appliance 402 and the device acting as a client of the HSM.

The HSM appliance 402 may be configured such that only the customer HSM administrator 410 and security officer 412 accounts created by the HSM administrator 410 have access to the cryptographic information stored by the HSM. Stated in another way, the HSM appliance 402 may be configured such that the CRP HSM administrator role lacks access to cryptographic material stored by the HSM appliance 402. In this manner, a computing resource provider can use the role of CRP HSM administrator 408 to create a customer HSM administrator 410 account. Credentials (e.g., login and password) can be provided to an authorized person of the customer and the authorized person can change the login and password, thereby causing the computing resource provider to lack access to any subsequently created logical partitions. Thus, while the computing resource provider may retain some administrative privileges (e.g., to securely erase cryptographic material after termination of a business relationship with the customer and to create a new customer HSM administrator account), the computing resource provider lacks access to the securely stored cryptographic material once the customer changes the login credentials of the customer HSM administrator 410 account.

Figure 5:
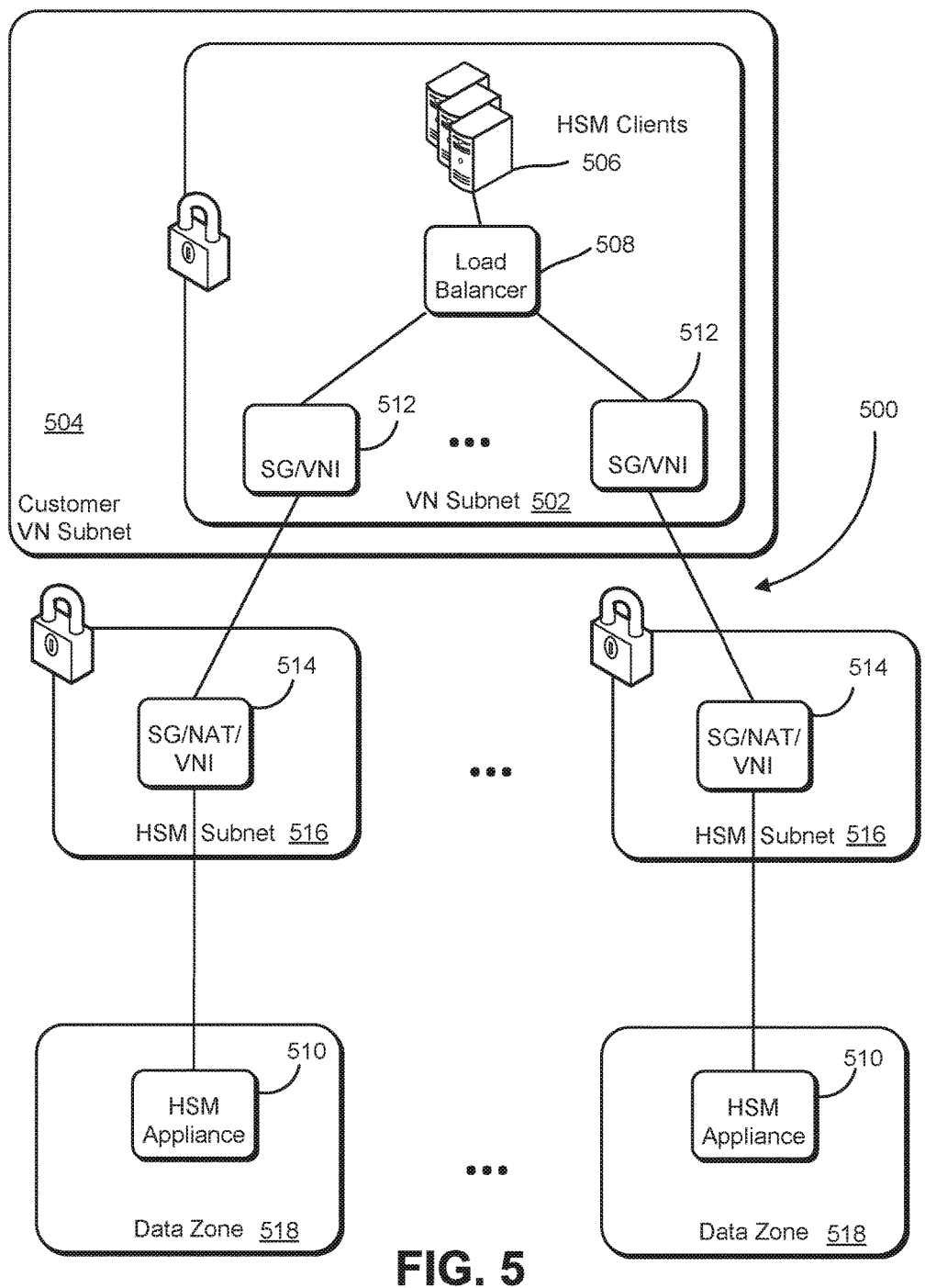
FIG. 5 shows an illustrative example of a manner in which hardware security modules can be provided with redundancy in accordance with at least one embodiment.

Various embodiments of the present disclosure also allow customers of a computing resource provider to utilize HSMs of the computing resource provider in a way that increases the likelihood that an HSM is operational when needed and/or in a way that improves performance (e.g., latency). FIG. 5, accordingly, shows an illustrative example of an environment 500 in which such technical advantages may be achieved. In the example of FIG. 5, a VN subnet 502 of a customer VN 504 may include various computing resources, at least some of which may be hosted by the computing resource provider, as described above. For example, as illustrated in FIG. 5, the VN subnet 502 of the environment 500 includes one or more HSM clients 506. Instead of communicating with a service gateway, as discussed above in connection with FIG. 3, in FIG. 5, the HSM clients 504 communicate with a load balancer 508. The load balancer 508 may be a device (e.g., a virtual computer system) provided by a virtual computer system service) that is configured to utilize one or more load balancing techniques (e.g., round robin and variations thereof), to distribute requests from the HSM clients 506. In this example, the load balancer 508 is configured to facilitate communication to one of a plurality of physical HSM appliances 510, such as described above. It should be noted, however, that capabilities of the load balancer 508 may be incorporated into one or more of the HSM clients. For example, one or more clients may have a load balancing application that performs load balancing functions or, generally, an ability to communicate with multiple HSMs which do not necessarily store information redundantly.

For example, the load balancer 506 may route traffic from an HSM client 504 to an HSM appliance 508 through a corresponding service gateway and virtual network interface (SG/VNI 512) of the VN subnet 502 and through a service gateway, NAT device, and VNI (SG/NAT/VNI 514) of a service VN subnet 516, such as described above in connection with FIG. 3. Thus, in this manner, from the perspective of the VN subnet 502 of the customer VN 504 (in particular, from the perspective of the load balancer 508), communications to an HSM appliance 510 are directed to the corresponding service gateway of the SG/VNI 512. Thus, for an HSM client 506 to submit a request to an HSM, the client device 506 may address the request to the IP address of the load balancer 508, which may forward the request to an appropriate HSM appliance 510, receive any responses, and forward responses to the requestor.

In this manner, high availability of HSMs is achieved while maintaining a simple configuration from the customer perspective. Further, techniques illustrated in FIG. 5, and variations thereof, may be used to provide numerous technical advantages. For example, as illustrated in FIG. 5, each HSM appliance may reside in a different data zone 518. The different data zones may be used to provide fault tolerance and/or lower latency (such as when HSM clients are distributed among different data zones).

As with all environments described herein, variations are considered as being within the scope of the present disclosure. For example, the SG/VNI components of the environment 500 need not, in some embodiments, sit behind a load balancer, such as when different HSMs are used for different purposes (e.g., when multiple HSMs, each storing a different key space are used). In addition, additional features in addition to those illustrated in the figures are considered as being within the scope of the present disclosure. For example, in environments where multiple HSMs are used for the purpose of redundancy, secure methods may be used to synchronize the information redundantly stored by the HSMs. For example, a public key cryptography scheme can be used to securely transfer information from one HSM to another. An HSM can encrypt information using the public key of a public-private key pair used by another HSM. The encrypted information can be transferred over a network to the other HSM to be decrypted using the private key of the public-private key pair.

Figure 6:
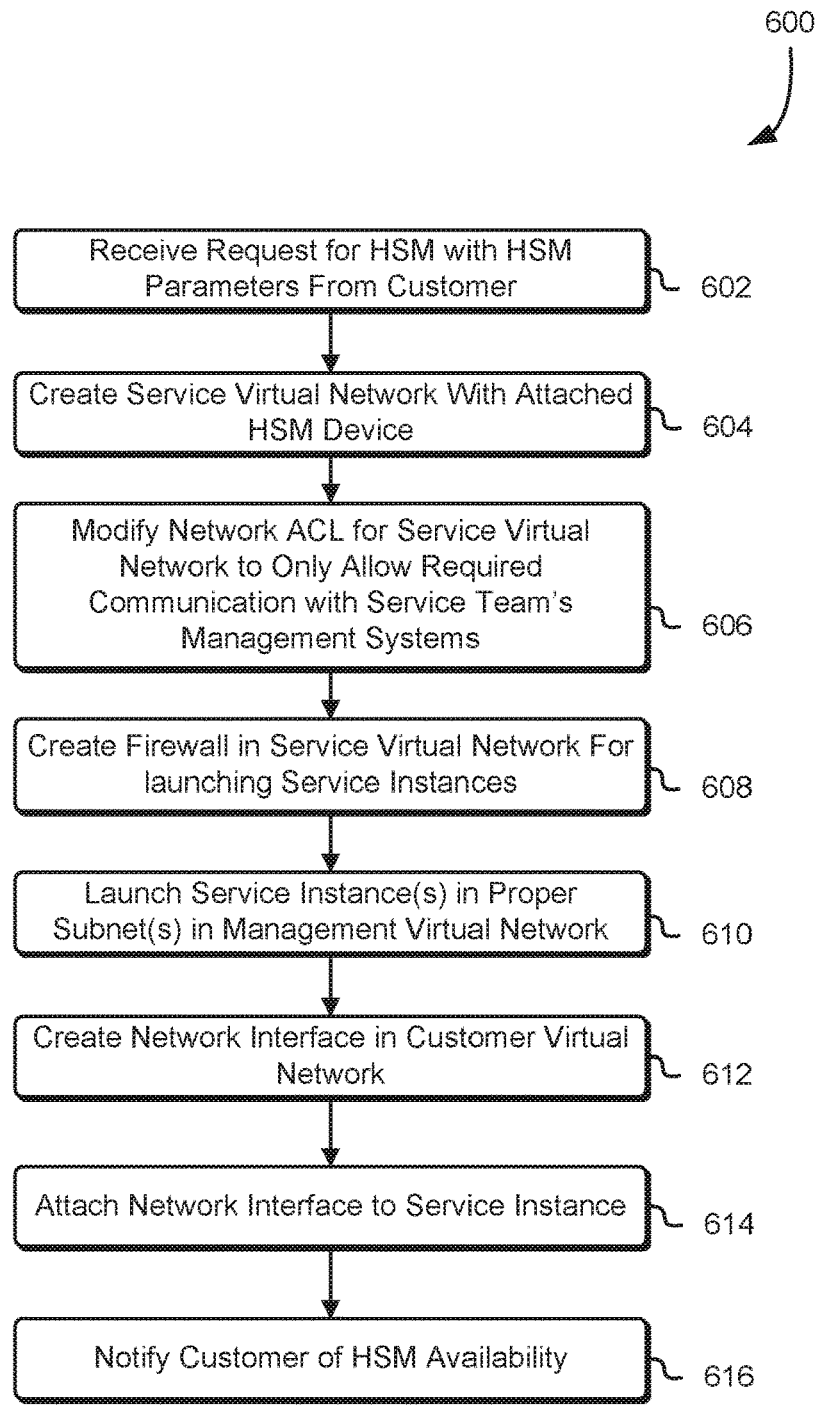
FIG. 6 shows an illustrative example of a process for processing a request for a hardware security module in accordance with at least one embodiment.

As discussed above, various embodiments of the present disclosure allow for customers of a virtual resource provider to add HSMs to virtual networks such that the computing resource provider hosts the HSM but customers are able to utilize the HSMs as if they were in the customers' own data centers. FIG. 6 shows an illustrative example of a process 600 for processing a request for an HSM in accordance with at least one embodiment. The process 600 may be performed by any suitable system, such as the CRP management system discussed above in connection with FIG. 2 or any system involved in the processing of requests submitted to a computing resource provider. In an embodiment, the process 600 includes receiving 602, from a customer (e.g., from a customer computing device) a request for an HSM, where the request includes a set of parameters for the HSM. The request may be, for instance, an API call with API parameters that encode the HSM parameters. It should be noted, however, that while FIG. 6 shows the parameters being included as part of the request, the parameters for the HSM may be provided separately from the request. Example parameters include an identifier of a VN of the customer hosted by the computing resource provider, an identifier of a subnet of the VN of the customer hosted by the computing resource provider, a model identifier for the HSM (in embodiments where the customer is provided the ability to select from multiple HSM models), an IP address space, an IP address type (e.g., IPv4 or IPv6), a notification mode (e.g., email address, message queue identifier or other identifier used for notifications) and/or other relevant information. In addition, the HSM parameters may specify one or more firewall parameters to apply to a network interface that will be placed in the identified customer VN. Generally, the parameters provide the computing resource provider information that enables the computing resource provider to integrate an HSM with a VN of the customer hosted by the computing resource provider.

Upon receipt 602 of the request, the process 600 may include creating 604 a service VN, such as the service VN 222 that has attached an appropriate HSM device (e.g., a device with model number matching HSM parameters). Creating 604 the service VN may include provisioning and/or configuring one or more computing resources that comprise the service VN. The service VN may include components, such as those discussed above in connection with FIG. 2. Further, the service VN may be created as a VLAN with public and private subnet, the public subnet used for the purpose of monitoring and diagnostics, and the private subnet used for communication with the customer VN. The service may be created to ensure that the service VN has a IP range that does not overlap with the IP range of the customer VN.

It should be noted that creating 604 the service VN may be performed in various ways in accordance with various embodiments. For example, in some embodiments, the computing resource provider provisions and prepares a service VN prior to receipt of a request for an HSM that, when processed, will utilize the service VN. In such embodiments, creating the service VN may include reconfiguring existing resources to integrate with the customer VN specified in the request. In other words, the computing resource provider may perform some operations for creating the service VN prior to receipt of the request. In addition, creating 604 the service VN may include additional operations, such as configuring the HSM device with which the customer will communicate through the service VN. Configuration of the HSM device may be performed in various way which may vary according to various HSM manufacturers and models. Generally, configuring the HSM device may include taking any actions that enable and/or facilitate the HSM device's operation as an HSM for the customer.

Upon creation 604 of the service VN, the process 600 may include modifying 606 an access control list (ACL) for the service to restrict communications to those from a service team management system. In this manner, the service VN is isolated from various unnecessary communications, yet allows for intervention by the computing resource provider should such intervention become necessary. A firewall for the service VN may then be created 608 for use when launching service instances (e.g., virtual computer systems to become part of the service VN). One or more service instances may then be launched 610 in the service VN, referencing the created firewall. The service instances may be virtual computer systems that operate inside of the service VN, such as the NAT instance 224 and service VN bastion 226, described above in connection with FIG. 2. Launching a service instance may include processing a provisioning workflow for the service instances, such as described above. Further, as noted previously, the instances may be launched at a different time and simply reconfigured. In this manner, the time between receipt 602 of the request and when the HSM is available for use by the customer may be reduced. Launching the service instance may also include reconfiguration operations, such as loading software and/or configuring any settings that need to be configured to enable the instance to function in the service VN.

As illustrated in FIG. 6, the process 600 includes creating 612 a network interface in the customer's virtual network, e.g., a customer VN specified in the HSM parameters. As discussed above, the network interface may be a VNI created and hosted by the computing resource provider. In an embodiment, creating the network interface may include using account impersonation to create the network interface in an appropriate subnet (e.g., a subnet specified by the HSM parameters) of the customer. Creating 612 the network interface may also include other operations, such as giving the network interface a description that corresponds to the HSM service. The description may, for instance, identify an HSM or that the network interface is for connecting to an HSM. In this manner, the customer may (e.g., in an inventory of customer devices hosted by the computing resource provider) distinguish the created 612 network interface from any other network interfaces that the customer may have in its virtual network hosted by the computing resource provider. Other operations included in creating the network interface may include assigning a private IP address to the network interface and configuring any security settings (e.g., to prevent the customer from changing a firewall of the network interface which may result in a loss of ability to manage the network interface from the computing resource provider perspective).

In an embodiment, the process 600 includes attaching 614 the created 612 network interface to an appropriate service instance (e.g., the NAT instance 224 discussed above in connection with FIG. 2). Attaching the created 604 network interface to the created service instance may include configuring any settings in both the service virtual network and the network interface to allow for communications to the network interface to proceed to the service virtual network and vice versa. For example, because the customer VN may be isolated, account impersonation may be used to modify settings for the customer VN to allow the customer VN to communicate with the service instance. Once the network interface has been attached to the service instance, the process 600 may include notifying the customer of the availability of the HSM. Notification may occur in various ways in accordance with the various embodiments, such as by electronic mail, instant message, putting a notification message in a notification queue and/or in other ways. Further, the manner in which notification occurs may be specified in the HSM parameters received in connection with the request.

Figure 7:
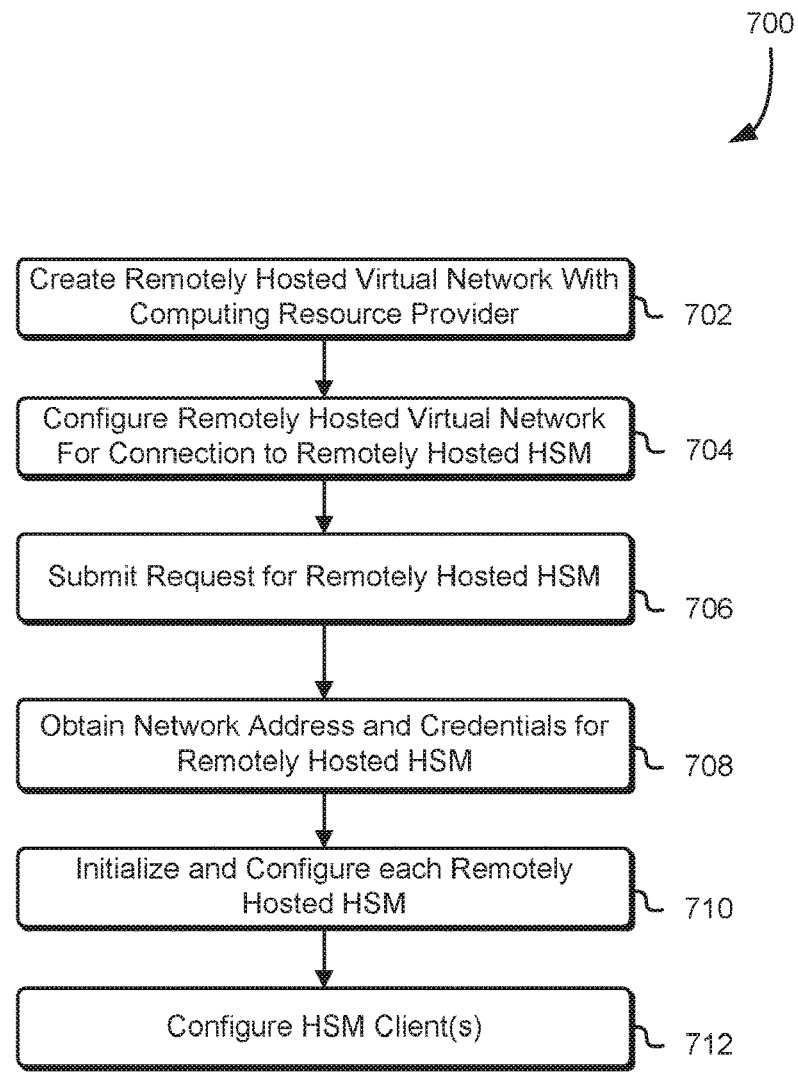
FIG. 7 shows an illustrative example of a process for utilizing a service providing use of a hardware security module in accordance with at least one embodiment.

FIG. 7 shows an illustrative example of a process 700 that may be performed by a customer in order to utilize an HSM offered as a service by a computing resource provider. The process 700 may be performed by any suitable system, such as a computing device of a customer under the control of an operator. In an embodiment, the process 700 includes creating a remotely hosted virtual network (e.g., a remotely hosted VLAN) with a computing resource provider that provides use of an HSM as a service. The remotely hosted virtual network may be created in various ways in accordance with the various embodiments. For instance, in some embodiment, appropriately configured API calls may be made to a management system of the computing resource provider to provision one or more computing resources (e.g., virtual computer systems), provide appropriate parameters for the VN (e.g., IP address range), provision a virtual private network (VPN) between the remotely hosted VN and an on-premise network, and the like. Generally, any manner in which a remotely hosted customer VN may be created may be used.

Once created, the remotely hosted virtual network may be configured 704 for connection to a remotely hosted HSM. Configuring 704 the remotely hosted virtual network may be performed, for example, by submitting API calls to a management system of the computing resource provider. Configuring 704 the remotely hosted virtual network may include setting appropriate access permissions to enable the computing resource provider to create a network interface inside of the remotely hosted virtual network. For example, appropriate API calls may be made to create a new role that allows the computing resource provider to create and attach a network interface. The role may be a third party role able to access the virtual network. A policy may be created for the role that allows the computing resource provider to create the network interface. Information about the role may be provided to the computing resource provider, which may use the information to create the network interface and then send the customer further instructions.

As illustrated, the process 700 includes submitting a request for a remotely hosted HSM to the computing resource provider. The request may be an appropriately configured API call with HSM parameters, such as described above. The computing resource provider may then provide a network address and credentials for an HSM. The network address may be a network address through which an administrative interface of the HSM can be accessed, such as the network interface that was created in the customer's virtual network. Accordingly, the process 700 includes obtaining 708 the network address and credentials for the remotely hosted HSM appliance.

With the network address and credentials for the HSM appliance, the process 700 may include initializing and configuring 710 the remotely hosted HSM. Initializing and configuring 710 the remotely hosted HSM may include connecting to the HSM over SSH (or in another suitable manner) and performing one or more operations. The operations may include changing the credentials (e.g., changing the password) so as to limit the ability of the computing resource provider to access information stored by the HSM. Other operations may include setting the time zone, system date and time for the HSM, adding a syslog endpoint to the HSM configuration to enable monitoring, adding a simple network management protocol (SNMP) and syslog configuration to the existing settings that have been provisioned by the computing resource provider. In addition, the initializing and configuring 710 the HSM may include reinitializing an HSM partition to permanently (i.e., irrevocably) delete any keys and/or cryptographic domains on the HSM and creating a public/private key pair for the HSM to communicate with other HSMs, such as described above. Creating the public/private key pair may include generating a certificate from the public key which may be provided to one or more HSM clients to enable communication with the HSM using a public/private key electronic signature scheme. Creating the public/private key pair may include transmitting a command to the HSM to cause the HSM to generate the public/private key pair and the certificate. In addition to the above, initializing and configuring 710 the remotely hosted HSM may include creating one or more HSM clients, such as discussed above, in the HSM (i.e., specifying to the HSM which clients are authorized to use the HSM.

As illustrated, the process 700 includes configuring 712 one or more HSM clients so that the one or more HSM clients are able to utilize the HSM. For instance, in an embodiment, configuring the HSM client may include creating a public/private key pair for an HSM client, which generates a certificate from the public key from the public/private key pair, such as described above. This certificate may be provided to the HSM (e.g., by encrypting the certificate using the public key of the HSM for decryption by the HSM using the corresponding private key) to enable the HSM to use the public key for generating electronic signatures provided to the HSM client for verification. Other operations may include registering the HSM client(s) with the HSM and assigning the HSM client(s) to one or more partitions of the HSM.

As with all processes described herein, variations of the process are considered as being within the scope of the present disclosure. For example, the operations illustrated do not necessarily need to be performed in the order presented. In addition, additional operations may be included for various purposes, such as for integrating HSMs into various environments. For example, numerous operations may be completed for numerous HSMs and customer VNs. Multiple HSMs may be set up for the purpose of increasing HSM availability, increasing performance, and decreasing the chance of total operational failure (e.g., by providing options for failover should an HSM become inoperable. In addition, customers may host their own on-premise HSMs. Various embodiments of the present disclosure may include synchronizing one or more on-premise HSMs with one or more remotely hosted HSMs so that, for example, a customer may utilize an on premise HSM and, should the on-premise HSM fail, use the remotely-hosted HSM. Further, should the customer choose to terminate a business relationship with the computing resource provider, the customer will maintain a copy of information (e.g., cryptographic keys) stored in the HSMs in its own HSM.

In addition, various embodiments of the present disclosure allow for re-use of an HSM once no longer needed by a customer. For instance, in some embodiments, a customer is required (e.g., by contract) by a computing resource provider to irrevocably erase cryptographic keys stored in any remotely hosted HSMs used by the customer before terminating use of the HSM as a service. In the case of bad debt (e.g., a customer does not or cannot pay, perhaps due to a bankruptcy), the computing resource provider may remote access to any remotely-hosted HSMs used by the customer (e.g., by disconnecting the HSM from a network, unplugging a power supply and the like) and still maintain the information on the HSM for a period of time during which the customer is provided opportunity to restore access to the HSM (e.g., by paying down debt or otherwise arranging access). After passage of the period of time, the computing resource provider may use its administrative access to transmit a command to any applicable HSMs to cause the HSM(s) to irrevocably erase any cryptographic information stored by the HSM(s). At this point, the computing resource provider may utilize any reclaimed HSMs to serve other customers, such as in a manner described above.

Numerous other variations are considered as being within the scope of the present disclosure. For example, as noted above, a computing resource provider may provide numerous types of services for use by customers. Various embodiments of the present disclosure include integration of a customer logical network with the services so that HSMs can be used in connection with use of those services. As an illustrative example, referring to FIG. 2, a customer may configure its customer VN to communicate with a data storage service offered by the computing resource provider (or another computing resource provider). One or more virtual computer systems of the customer VN, for example, may be configured to communicate over the Internet and use a Web services interface of the data storage service. Permissions on data storage objects stored by the data storage service may limit access to the data objects, for instance, so the objects are only accessible from the customer VN. Various embodiments of the present disclosure allow for integration with the data storage service to allow, for instance, server-side encryption. The customer VN may be configured so that a server of the data storage service can submit data to the HSM to be encrypted. The server may provide plaintext to the HSM and the HSM can return ciphertext generated using an appropriate key (e.g., a key having an identifier specified by the server or specified by default). The plaintext may be a key used by the server to encrypt a data object and the server can store with the encrypted data object the encrypted key. Similarly, the server can provide the encrypted key to the HSM for decryption and the HSM can decrypt the key, provide the decrypted key for use by the server in decrypting the data object. Other variations are also considered as being within the scope of the present disclosure.

Figure 8:
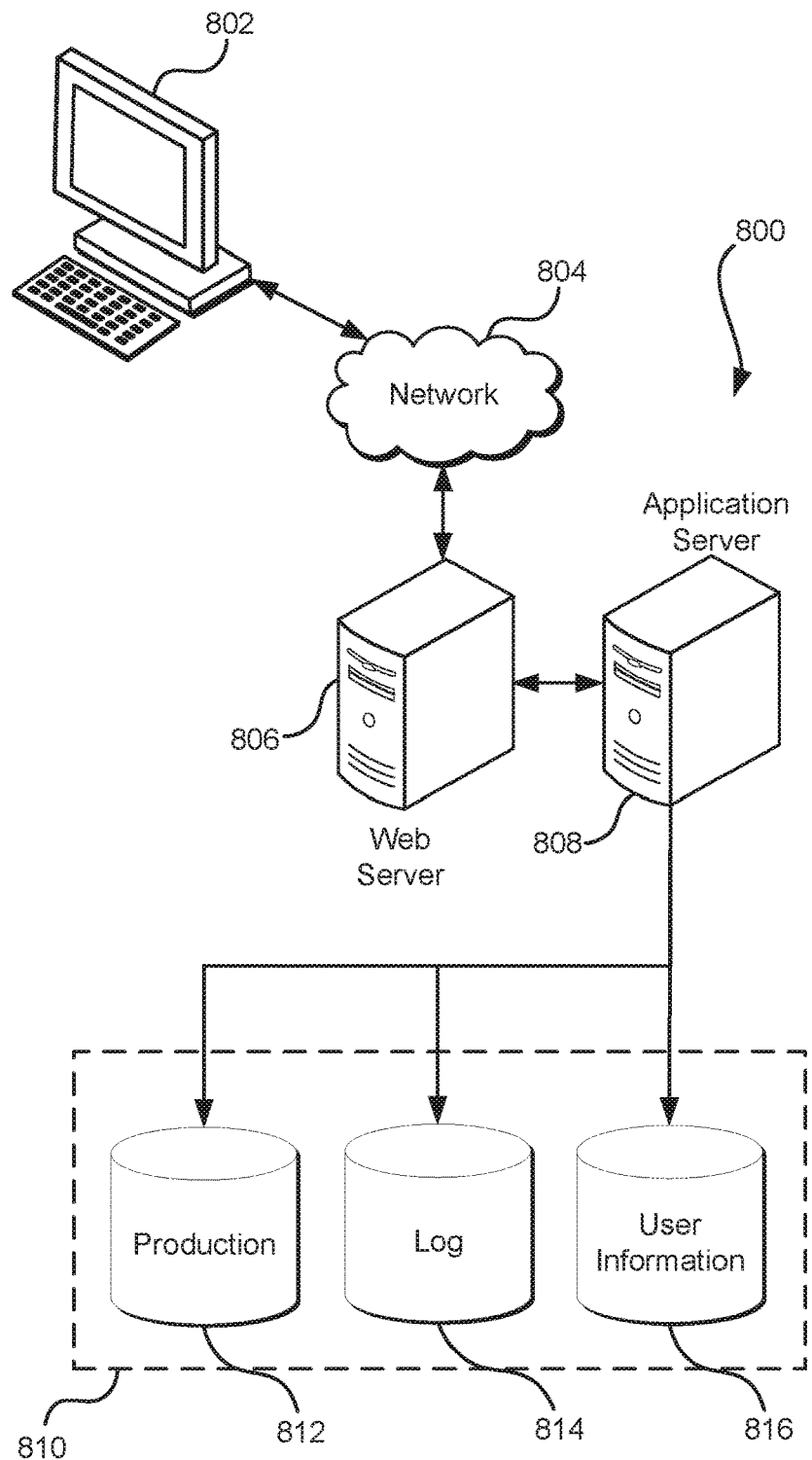
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a some (even a majority) of the data access and business logic for an application. The application server may provide access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser. It should be noted, however, that embodiments of the present disclosure are not necessarily limited to the context of Web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, on a first network, a first request for a hardware security module from a plurality of hardware security modules managed by a computing resource service provider;
    causing, based at least in part on parameters included in the first request, the computing resource service provider to connect the hardware security module of the plurality of hardware security modules to a second network; and
    routing a second request at the first network to the hardware security module of the second network.

2. The computer-implemented method of claim 1, wherein the first network is an on-premise network associated with a customer of the computing resource service provider implementing the second network.

3. The computer-implemented method of claim 1, wherein the second network, as a result of identifying the hardware security module, implements a virtual network to associate with the hardware security module.

4. The computer-implemented method of claim 3, further comprising:
    generating, by a device on the first network, a cryptographic request;

submitting the cryptographic request to cause the second network to route, via the virtual network, the cryptographic request to the identified hardware security module; and routing a result of the cryptographic request to the device.

5. The computer-implemented method of claim 1, wherein information included in the request includes a credential associated with the hardware security module.

6. The computer-implemented method of claim 1, further comprising presenting the hardware security module on the first network as a local device of the first network.

7. A system, comprising:
memory to store instructions that, if executed by one or more processors of the system, cause the system to:
obtain, outside of a network, a first request for a hardware security module from a plurality of hardware security modules managed by a computing resource service provider;
cause, based at least in part on parameters included in the first request, the hardware security module of the plurality of hardware security modules to be added inside of the network; and
route a second request to the hardware security module.

8. The system of claim 7, wherein the instructions, if executed, further cause the system to:
cause inside of the network to add a virtual network to associate with the selected hardware security module;
associate the virtual network with a network interface outside of the network; and
route cryptographic requests to the selected hardware security module via the network interface.

9. The system of claim 7, wherein the request is an application programming interface (API) call to an API provided via inside of the network.

10. The system of claim 7, wherein the hardware security module is selected from a plurality of hardware security modules inside of the network.

11. The system of claim 7, wherein the second request is associated with a cryptographic operation to be performed by the security module outside of the network.

12. The system of claim 7, wherein the hardware security module stores, in a manner inaccessible to any other device inside of the network, cryptographic information on behalf of a device outside of the network.

13. A non-transitory computer-readable storage medium having instructions that, if executed by one or more processors of a computer system, cause the computer system to:
obtain, on a first network, a first request for a hardware security module from a plurality of hardware security modules managed by a computing resource service provider;
cause, based at least in part on parameters included in the first request, the computing resource service provider to identify the hardware security module of the plurality of hardware security modules to connect to a second network; and
route a second request at the first network to the hardware security module of the second network.

14. The non-transitory computer-readable storage medium of claim 13, wherein the instructions, if executed, further cause the computer system to cause generation of a network interface that enables the first network to connect to the hardware security module.

15. The non-transitory computer-readable storage medium of claim 13, wherein the first network is a physical network remote from the second network.

16. The non-transitory computer-readable storage medium of claim 13, wherein the second network identifies the hardware security module for exclusive use by the first network.

17. The non-transitory computer-readable storage medium of claim 13, wherein the second network is hosted by a computing resource provider and managed by a device associated with the first network.

18. The non-transitory computer-readable storage medium of claim 17, wherein the second network includes a network address designated by the device.

19. The non-transitory computer-readable storage medium of claim 13, wherein the second request is routed to the hardware security module via network address translation between a first network address on the first network and a second network address of the hardware security module.

20. The non-transitory computer-readable storage medium of claim 13, wherein the first request is a web service call to an interface of a computing resource service provider implementing the second network.

* * * * *